UNITED STATES PATENT OFFICE.

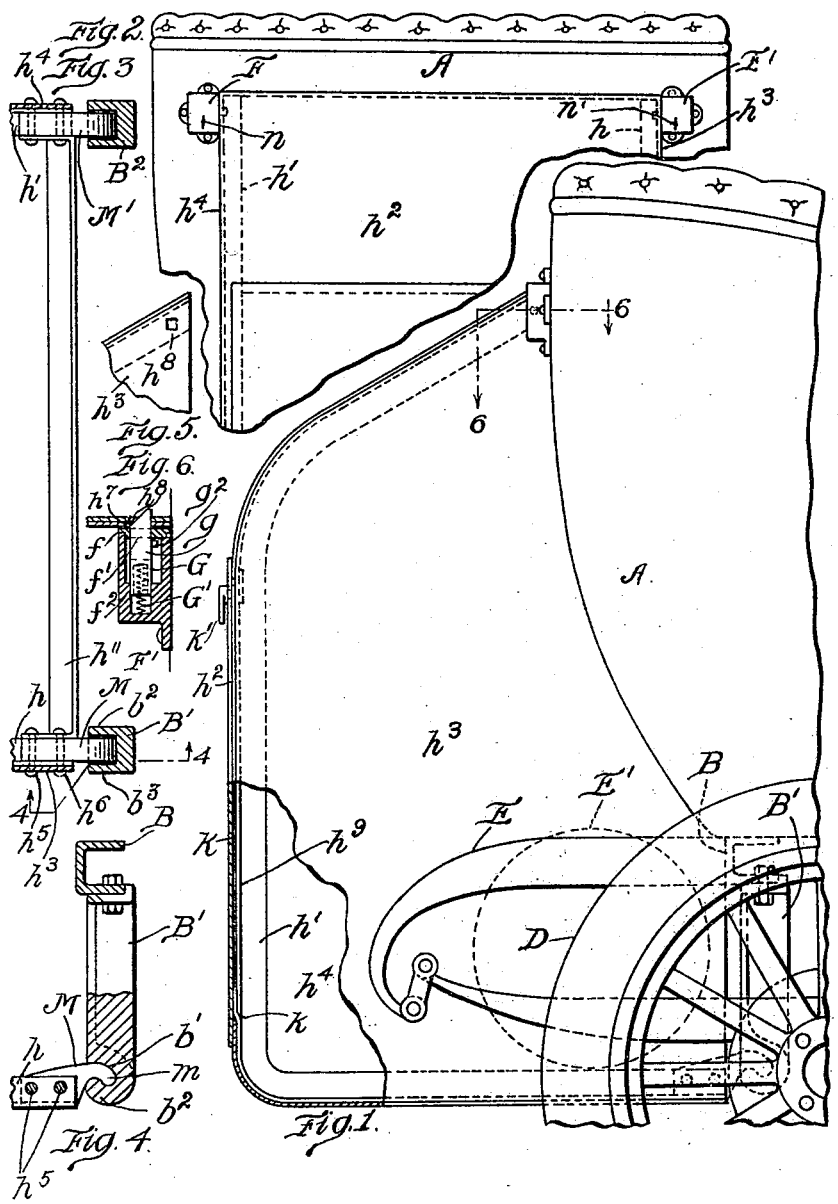

PETER GUNDAL, OF BOSTON, MASSACHUSETTS.

CARRIER FOR ATTACHMENT TO VEHICLES.

1,409,543.   Specification of Letters Patent.   Patented Mar. 14, 1922.

Application filed November 6, 1920. Serial No. 422,324.

*To all whom it may concern:*

Be it known that I, PETER GUNDAL, a citizen of the United States, and resident of Boston, in the county of Suffolk and State of Massachusetts, have invented a new and useful Carrier for Attachment to Vehicles, of which the following is a specification.

The main object of my invention is to provide a carrier for ready attachment to, and detachment from, vehicles. I have particularly in mind using my carrier to convey a compressor for use in operating a tool to mark monuments in cemeteries but my carrier is of course useful to carry any desired article, such as a trunk, and is useful also in connection with spare tires, either to carry them or to prevent undesired access to them if carried directly by the body of the vehicle.

A feature of my invention consists in interlocking my carrier at one point with the body of the vehicle and then swinging it into normal position for locking at another point, which locking is preferably automatic.

Another feature is a particular interlocking connection, preferably consisting of an arcuate recess in one member to receive a correspondingly shaped projection on the other member.

Another feature is an automatically acting latch.

Other features will be pointed out below.

In the drawing—

Figure 1 is a side elevation, partly in section, of my device attached to the rear end of an automobile;

Figure 2 is a partial rear elevation of the parts shown in Figure 1;

Figure 3 is a sectional detail in plan of the lower portion of the carrier;

Figure 4 is a section of line 4—4 of Figure 3;

Figure 5 is a fragmentary view in elevation of the upper portion of the carrier; and Figure 6 is a section on line 6—6 of Figure 1.

The base A of an automobile is suitably connected to chassis B and the usual wheel D and spring E are provided at each side and also the gas tank E'. Connected to, and depending from, the chassis at each side are brackets B' and B², which are alike and therefore only bracket B' needs be described. This bracket is formed at the bottom with an arcuate recess or female portion $b'$, whose side walls are shown at $b^2$ and $b^3$.

Attached to the body are two latch boxes F and F', the latter being shown in sectional enlargement in Figure 6. Box F' has a cover $f$ with a non-circular opening $f'$ and the box itself is formed with a guiding passage $f^2$ for the latch G, which is non-circular in cross-section at $g$ so as to cooperate with opening $f'$ to prevent turning of the latch. The latch G is recessed to receive the end of coiled spring G' which tends to keep the bevelled end of latch G projecting from the box, outward movement of the latch being limited by pin $q^2$.

The carrier itself comprises two curved side angle irons $h$ and $h'$ and a cross angle iron $h^{11}$, and also a curved back plate or sheathing $h^2$ and two side plates or sheathing $h^3$ and $h^4$, all suitably riveted together as at $h^5$ and $h^6$ or otherwise suitably connected to make a strong and durable whole. The side plates are perforated as at $h^7$ and the side angle irons as at $h^8$ to cooperate with the corresponding latches. The back plate or sheathing $h^2$ may have openings $h^9$ to be closed by a removable door K having a holding projection $k$ and a locking handle $k'$. This door may be locked if desired and would preferably not be used if the carrier is to be used as a protection against undesired removal of tires, for example.

I may also provide a suitable opening in one of the side plates if I desire to make an operating connection from the outside to operate the compressor referred to.

To the inner end of side angle iron $h$ is connected by the rivets referred to a member M, a similar member M' being provided at the other side, member M being formed with a male projection in the form of an arcuate lug $m$, concentric with the recess $b'$.

When the carrier is to be applied the lug $m$ and the corresponding lug at the other side are inserted in the recesses with the upper portion of the carrier canted away from the body of the vehicle and then the end opposite from said lugs is swung upwardly forcing the latches inwardly until the openings $h^7$ and $h^8$ come opposite the latches which are then forced outwardly by their springs to automatically lock the carrier in place. Easy removal may be had by inserting a key in the holes $n$ and $n'$ and forcing back the latches.

My carrier is conveniently arranged between the springs on the body so that it is adapted for ready application to practically all automobiles but of course it could be modified so as to enclose the springs if desired.

What I claim is:

1. A device of the character described comprising a carrier; a body; carrier supporting means through which one portion of the carrier is fastened to the body comprising a male member and a female member one of which is mounted on the body and the other of which is mounted on the carrier, said two members being engaged by bringing them together with the carrier in canted relation to the body and being interlocked by a swinging movement of the carrier from said canted position to its normal position; and means for holding the carrier in its normal position.

2. A device of the character described comprising a carrier; a body; carrier supporting means through which one end of the carrier is fastened to the body comprising a male member extending normally horizontally and a female member one of which is mounted on the body and the other of which is mounted on the carrier, said two members having rigid connection with the body and carrier respectively and being engaged by bringing them together with the carrier in canted relation to the body and being interlocked by a swinging movement of the carrier from said canted position to its normal position; and means for separably fastening the opposite end of said carrier to said body to hold the carrier in its normal position.

3. A device of the character described comprising a carrier; a body; carrier supporting means through which one end of the carrier is fastened to the body comprising a male member and a female member one of which is mounted on the body and the other of which is mounted on the carrier, said two members being engaged by bringing them together with the carrier in canted relation to the body and being interlocked by a vertical swinging movement of the carrier from said canted position to its normal position; and means for separably fastening the opposite end of said carrier to said body to hold the carrier in its normal position.

4. A device of the character described comprising a carrier; a body; carrier supporting means consisting of two interlocking members one of which is fast on the body and the other on the carrier, one of said members being made with an arcuate recess and closely fitting a correspondingly shaped arcuate lug on the other member, and said arcuate shapes of the recess and lug permitting said two members being locked or unlocked by swinging movement of the carrier.

5. A device of the character described comprising a carrier; a body; carrier supporting means through which one portion of the carrier is fastened to the body comprising a male member extending normally horizontally and a female member one of which is mounted on the body and the other of which is mounted on the carrier, said two members being engaged by bringing them together with the carrier in canted relation to the body and being interlocked by a swinging movement of the carrier from said canted position to its normal position; and a latch for automatically locking another portion of the carrier to the body when the carrier is swung into normal position.

6. A device of the character described comprising a carrier; a body; carrier supporting means through which one portion of the carrier is fastened to the body comprising a male member and a female member one of which is mounted on the body and the other of which is mounted on the carrier, said two members being engaged by bringing them together with the carrier in canted relation to the body and being interlocked by a swinging movement of the carrier from said canted position to its normal position; and a key-operated latch for automatically locking another portion of the carrier to the body when the carrier is swung into normal position.

PETER GUNDAL.